United States Patent Office 3,300,138
Patented Jan. 24, 1967

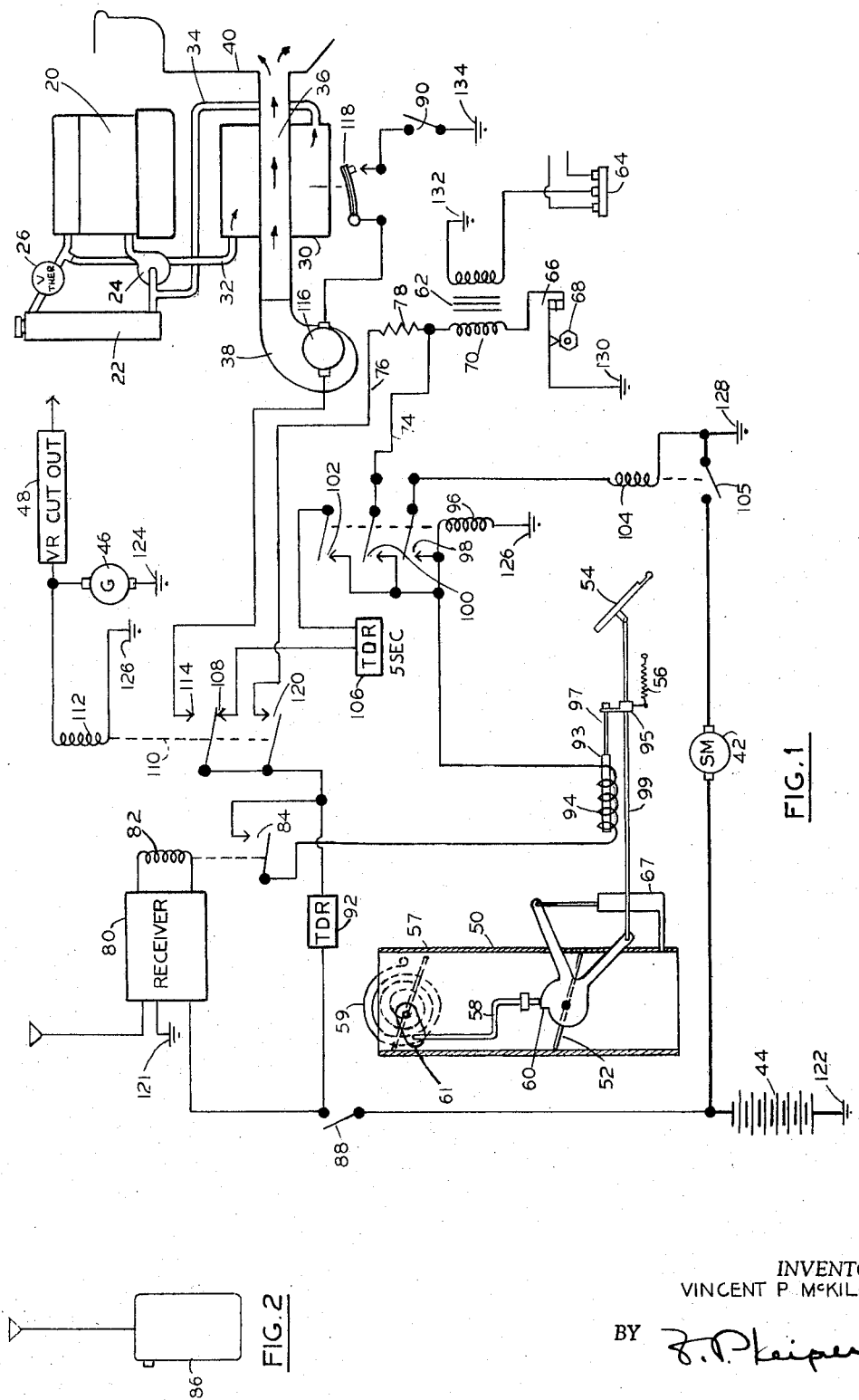

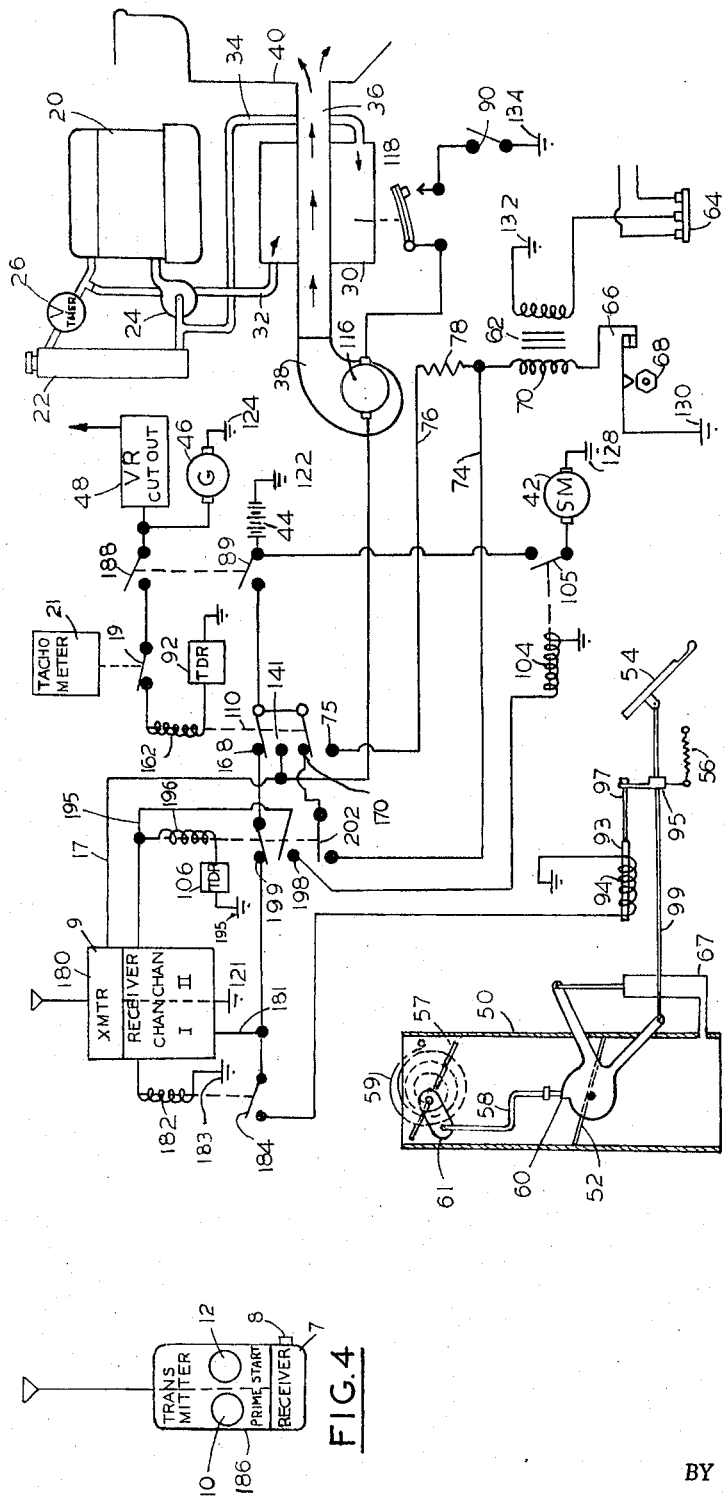

3,300,138
MOTOR VEHICLE PREHEATER
Vincent P. McKilligan, R.D. 1, Unadilla, N.Y. 13474
Filed May 14, 1964, Ser. No. 367,407
7 Claims. (Cl. 237—8)

This invention relates to motor vehicle heating, and more particularly to apparatus initiated by remote control for automatically providing engine warm-up and preheating of the vehicle body.

It is the practice of many automobile owners to park their cars on the street, in driveways and in unheated garages. While most of such vehicles are provided with heaters to provide hot air heat for the vehicle body and the comfort of the driver and passengers, such heaters utilize waste heat from the hot water of the engine cooling system, and are ineffective as a heater until the engine has been warmed up. Thus during winter in the colder climate areas, the driver and passengers are subjected to a cold car for many minutes after commencing a trip. While the engine is made to function satisfactorily during warm up, no heat for the comfort of the passengers or for defrosting or other purposes is available until the engine temperature has actually approached its normal running temperature.

The present invention is directed to apparatus for starting the engine of an automobile by remote control, whereby the engine may be warmed up without attendance of a driver, and whereby the car body itself may be brought to a comfortable temperature, prior to any occupancy of the car whatever. More particularly the invention comprises a coded radio signal control comprising a radio transmitter, and receiver for initiating starting of the internal combustion engine independent of the usual manual controls for effecting starting. The invention further has to do with the subsequent bringing of the car body up to a comfortable temperature from engine heat, so that a comfortable riding temperature is achieved prior to any occupancy of the car. It is contemplated that the car will be locked against occupancy during the operation of the apparatus. Provision is further made for preventing prolonged attempts at engine starting resulting from the initiating coded radio signal, and provision is made for terminating the running of the engine automatically after a time sufficient to warm the body portion of the car. Provision is further had for delaying the operation of the heater blower until engine temperature has risen to a predetermined value. The apparatus further includes mechanism for conditioning the engine for starting at the beginning of each starting cycle.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings there is shown diagrammatically a circuit and apparatus for achieving the results set forth wherein:

FIGURE 1 is a diagrammatic circuit as applied to the vehicle apparatus;

FIGURE 2 indicates a coded radio transmitter, which may be operated at some distance from the vehicle, as in the vehicle owner's residence or office.

FIGURE 3 is an alternative circuit; and

FIGURE 4 indicates an alternative coded radio transmitter and receiver.

Referring to FIGURES 1 and 2 of the drawings there is shown the usual vehicle internal combustion engine 20, water cooled by radiator 22, the water being circulated by a centrifugal pump 24. Return flow to the radiator 22 is blocked by a thermostatic valve 26, until the engine attains running temperature, such as 180° F. A car heater of any suitable heat exchange type is indicated at 30, the heater being adapted through water connections 32 and 34 to the engine and pump to derive hot water from the engine as soon as available. The heater has an air passage 36 for heating the air blown through it by the motor driven blower 38, the hot air being discharged into the body 40 of the closed vehicle.

The engine is provided with the usual starter motor 42, energized through a solenoid actuated switch 105 from the storage battery 44 of the vehicle electrical system. A generator 46, driven by the engine is connected through a voltage regulator and cutout 48 to the battery 44 for recharging by a circuit not shown, such circuitry being well understood in the art.

The engine has the usual carburetor 50, and throttle valve 52, actuated by an accelerator foot pedal 54, the throttle being urged to a closed position by a spring 56. Such carburetor has the usual automatic choke diagrammatically shown in the form of an unbalanced valve 57 urged open by air intake and thermostat 59 for urging the same closed when cold, and a fast idle 61 actuated thereby for preventing the throttle valve from closing, when the carburetor and engine are cold. Such a fast idle is diagrammatically indicated by the pin 58, which drops into the cam in front of the tooth 60, when the throttle is first opened, and as is well understood in the art, the pin 58 is thermostatically lifted from the path of the tooth 60, when the engine warms up to normal operating temperature.

The engine may also have the usual ignition system comprising a spark coil 62, distributor 64, and breaker points 66 actuated by a multiple lobe cam 68. The primary 70 of the coil 62 may be supplied by the full 12 volts of the battery 44 through lead 74, to provide a hot spark for starting, and at a lower voltage from lead 76 through resistor 78 for running.

A receiver 80 mounted in the vehicle, and sensitive to a coded radio signal having a predetermined modulated carrier wave, as emitted by the transmitter 86, energizes the relay coil 82 to close the relay contacts 84, for the short duration of the reception of the signal. Such signal is generated by and transmitted from a small low power transmitter such as 86, which may be located nearby as for example in the car owner's house.

Before leaving the car for any length of time during which the engine is likely to become cold, the switches 88 and 90 are closed, which energizes the receiver 80 which may be of a transistorized design for low current consumption. When the predetermined signal emitted by transmitter 86 closes contacts 84, a circuit is established from the battery 44 through the time delay device 92 adapted to remain closed for about 15 minutes, contacts 84, accelerator solenoid 94 and relay coil 96. Energization of solenoid 94 opens the throttle valve, so that the fast idle pin 58 may drop into the cam in front of the tooth 60 to hold the throttle partially open in fast idle position. Energization of relay coil 96 closes contacts 98, 100 and 102. Contacts 98 close a circuit to the starter switch solenoid 104 closing the starter switch contacts 105, energizing the starter motor 42 and cranking the engine 20.

Closure of contacts 100 completes a circuit to the ignition coil primary 70. Closure of contacts 102 completes a hold-in circuit for relay coil 96, completing a circuit through the time delay relay 106, which may be set for five seconds, closed contacts 108 of relay 110, and back to the battery through the time delay device 92. When the contacts 102 close, the accelerator actuating coil 94 is shunted, if contacts 84 are still closed, so that the energization of solenoid 94 is limited to a brief period long enough to rotate the throttle valve to open position so that it may then partially close to the fast idle position as by spring 59. In doing so, a primary charge of gasoline may be delivered to the carburetor by the simultaneous actuation of the acceleration pump indicated at 67. If the engine does not start in a reasonable time such as five seconds, time delay relay 106 opens and the starting attempt initiated by the coded radio signal is terminated. Thereafter there may be transmitted a subsequent or second signal to the receiver 80 to initiate a further starting cycle.

Assuming the engine starts, the generator 46 builds up full voltage energizing relay coil 112 of relay 110. Thereupon contacts 108 are broken and a connection to contact 114 is established which energizes a circuit to the air blower motor 116. Such circuit however is preferably not completed until the water temperature in the heat exchanger 30 rises to about 140° F. whence the thermostatic switch 118 closes to complete the circuit. When the relay coil 112 is energized, contacts 120 are also closed (contacts 108 are opened) to complete an ignition circuit through the resistor 78, to reduce the spark intensity to a value suitable for running. Opening of contacts 108 promptly deenergizes coil 96 and relay contacts 98, 100 and 102 open to disconnect the starting motor, and the hot spark connection through lead 74.

It will be understood that all grounds 121, 122, 124, 126, 128, 130, 132 and 134, are in practice, grounded to the frame of the vehicle.

If desired the thermostat switch 118 can be eliminated by a direct connection across switch 119. However, until the water temperature rises to a temperature suitable for providing heat, it is desirable to save the energy of the battery which would be used operating the blower. If desired the contacts 98 may be eliminated by connecting the starter relay coil 104 directly to lead 74 and to switch 100. In this event the coil will be continually in parallel with the coil 70, but since the voltage is reduced by the resistor 78, the coil 104 will be energized insufficiently to close switch 105.

To safeguard against a change of mind of the operator, or forgetfulness, the time delay device 92 will open and stop the engine after a running period such as 15 minutes, which period will be chosen so as to be at least long enough to effect car heating to a comfortable temperature.

Once either time delay relay 106, or time delay device 92 opens the circuit, the hold-in circuit through relay contacts 108 is broken and coil 96 deenergized. Subsequently, as will be understood in the art, the time delay relay 106, and time delay device 92 reclose, and the circuit is then ready for recycling upon transmission of the coded signal to the receiver 80.

In the modified form shown in FIGURES 3 and 4, the car receiver 180 is adapted to receive signals on two channels, and also embodies a transmitter 9 (XMTR), which will transmit a signal when the engine 20 is running. The transmitter 186 which will be located in the operator's house is adapted to transmit signals on two channels and to receive the signal of the transmitter 9 associated with the receiver 180, when the button 8 is depressed, and emit an audible or visual indication responsive to the reception of such a signal. Upon depressing button 10, a signal on channel 1 is transmitted that operates the accelerator solenoid 94, to open the throttle 52, thereby allowing the fast idle stop 58 to drop in place, and allow the unbalanced choke valve 57 to close under the urge of the cold thermostatic spring 59, and to provide a priming charge of gasoline, by actuating the acceleration pump 67, all as will be understood in the art. Several such priming charges may be supplied by repeated pressing of the button 10 to transmit additional signal pulses, each signal pulse energizing relay coil 182, grounded as at 183, and closing contacts 184 to energize the solenoid 94. Such circuit is energized from the battery 44 through the normally closed relay contacts 199, 168, and switch 89, the switches 89 and 188, and 90 being closed manually by the operator before leaving the vehicle for any substantial length of time. It will be seen that the car receiver is also energized by lead 181 when the contacts 89, 168 and 199 are closed.

After supplying a suitable number of priming charges, the operator depresses contact 12 which transmits a signal on channel II to energize relay coil 196, which is connected to ground as at 195 through a time delay relay 106 adapted to open the circuit on five seconds delay. The energization of relay coil 196 opens contacts 199 and closes contacts 198, and establishes a circuit from the battery 44 through closed contacts 89 and 168 to the starting motor switch solenoid 104, and thus closes the starting motor contacts 105 to commence cranking of the engine 20, by the starting motor 42 from battery 44. A hold-in circuit 195 is also established.

At the same time, contacts 202 are closed by relay coil 196 to establish a direct circuit from the battery 44 to the ignition coil 70, through lead 74 and normally closed relay contacts 170. Should the engine 20 start promptly, or within the period of five seconds as allowed by the time delay relay 106, the engine driven generator 46 will establish a voltage to energize relay solenoid 162, and open contacts 168 to deenergize starter switch solenoid 104 and open the hold-in circuit 195 for relay coil 196. At the same time contacts 170 will be opened, and contacts 75 closed to establish a low current running ignition connection to the battery through lead 76 and ignition current reducing resistance 78. In circuit with the relay coil 162 is a tachometer actuated switch 19 which is normally closed, but which is opened by the engine speed responsive tachometer 21. Should engine speed be excessive for any reason such as a sticking throttle 52, the tachometer, acting in response to engine speed, will open switch 19 to deenergize solenoid 162 and open contacts 75 and open the ignition circuit 76.

Also in circuit with the solenoid 162 is a time delay device 92, which may be set to open after fifteen minutes, an adequate time for bringing the car body up to a comfortable temperature.

It will be seen that as engine temperature rise closes contacts 118, the blower 116 is energized through a circuit including contacts 141, previously closed upon energization of coil 162, and upon the closing of contacts 141, the transmitter 9 is energized through lead 17, and the signal emitted thereby can be picked up by receiver 7, to show that the engine has started. Should the engine stop, the generator voltage decays, and with deenergization of the coil 162, relay contacts 141 open, and the transmitter 9 is deenergized, terminating the engine running signal so that the receiver 7 will no longer indicate that the engine is running.

It will be seen, that except for the accelerator actuating solenoid 94, and its plunger 93, and link 97, which freely slides and overruns in the bracket 95 affixed to the accelerator rod 99, and thereby does not interfere with normal accelerator operation, all the connections in either modification to the usual automotive vehicle components are of an electrical nature, which are so designed as to avoid interference with the normal connections provided in the usual motor vehicle. Thus, once a driver enters the preheated vehicle, opening of switch contacts 88 and 90, or 188, 89 and 90, deenergizes the automatic radio initiated starting circuits and the receiver 80 or 180, and the normal standard circuitry to the various components forming a part of the original equipment of the vehicle, all of which is left intact, are ready for driver operation.

No particular description of the transmitters or receivers has been provided since many types of such transmitters and receivers are available. Several forms of such coded signal transmission apparatus are disclosed in Patents #3,090,959, #2,921,292 and #2,886,703.

While two forms of the invention have been illustrated and described, and variations indicated, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A motor vehicle body preheater having an internal combustion engine and means to heat the body of said vehicle from waste heat of said engine, said engine having a starting motor and a fuel and air mixture device with a throttle to control the speed of said engine, and a thermostatically actuated choke to enrich the mixture for starting, said choke having means to prevent the throttle from closing once opened when cold to provide a fast idle, a solenoid device for opening said throttle from closed position, a coded radio signal receiver having a relay energized by reception of a coded signal transmitted from without the vehicle, and means for energizing said starting motor and for energizing said solenoid device for to open said throttle and means responsive to engine starting for deenergizing said starting motor and said throttle actuating solenoid device.

2. A motor vehicle body preheater in accordance with claim 1 wherein the engine is liquid cooled and the vehicle body is heated by air heated from a heat exchanger supplied with engine heated cooling liquid, and delivered to the vehicle body by a blower, and means responsive to a substantial rise in temperature of the cooling liquid of said engine for energizing said blower.

3. A motor vehicle body preheater comprising a vehicle having an internal combustion engine, a closed body for passengers, and means to heat said body from the waste heat of said engine, engine starting means, a carburetor having a throttle valve, automatic choke means actuated by the choke when cold to prevent closure of said throttle, and an accelerating well associated with the carburetor and actuated by opening said throttle, a coded radio signal receiver having a relay energized by reception of a coded signal transmitted from without the vehicle, and means to energize said engine starting means and open said throttle upon the actuation of said relay, and means responsive to engine running to deenergizing said starting motor and said throttle opening means, and a short period time delay relay in series with said signal actuated relay to suspend engine starting upon failure of the engine to achieve running prior to the actuation of said time delay relay.

4. A motor vehicle body preheater according to claim 3 wherein the body heating means includes a blower for delivering heat to the body, and wherein said means responsive to engine running energizes said blower.

5. A motor vehicle body preheater according to claim 3 wherein the body heating means includes a blower for delivering heat to the body, and wherein said means responsive to engine running establishes a circuit for energizing said blower, and means responsive to a substantial rise in engine temperature for completing said circuit.

6. An automotive vehicle body preheater, comprising an internal combustion engine, and means for utilizing the waste heat thereof for heating the vehicle body, a radio receiver carried by the vehicle responsive to a coded radio signal, and a relay actuated by said receiver in response to reception of a coded signal transmitted from without the vehicle, a starting motor, a starting battery and starting relay for cranking said engine, an electrical circuit connected to said battery and completed by said radio receiver relay and including the solenoid of a second relay, a second circuit closed by energization of said second relay for energizing said starting relay to crank said engine, an engine ignition circuit including a starting branch and a running branch having a current reducing resistor in series therewith, a fourth circuit leading from said battery to said ignition starting branch and closed by energization of said second relay, a third relay energized by engine running, a hold-in circuit for said second relay opened by energization of said third relay, and a circuit established from said battery to said ignition running branch by energization of said third relay, and a circuit including a blower associated with said heating means and said battery closed by energization of said third relay.

7. An automotive vehicle body preheater deriving waste heat from the internal combustion engine power plant of the vehicle in accordance with claim 6 wherein time delay means is interposed in the battery circuit to open the ignition and blower circuits upon the lapse of a period of time sufficient under normal conditions to heat the vehicle body from the running of said engine and the waste heat generated thereby.

References Cited by the Examiner

UNITED STATES PATENTS

| | | | |
|---|---|---|---|
| 1,497,194 | 6/1924 | Norden et al. | 340—224 |
| 2,019,991 | 11/1935 | Nilson | 237—12.3 X |
| 2,212,386 | 8/1940 | Cameron | 200—38 |
| 2,264,945 | 12/1941 | Le Fevre | 237—12.3 X |
| 2,864,596 | 12/1958 | Dermond | 236—101 X |
| 3,159,212 | 12/1964 | Patrick. | |

EDWARD J. MICHAEL, *Primary Examiner.*